Oct. 31, 1961  M. L. BENJAMIN ET AL  3,006,653
CHUCK FOR GEARS AND THE LIKE
Filed Oct. 14, 1960  2 Sheets-Sheet 1

INVENTORS
MILTON L. BENJAMIN &
DAVID D. WALKER
BY
Oberlin, Maky & Donnelly
ATTORNEYS

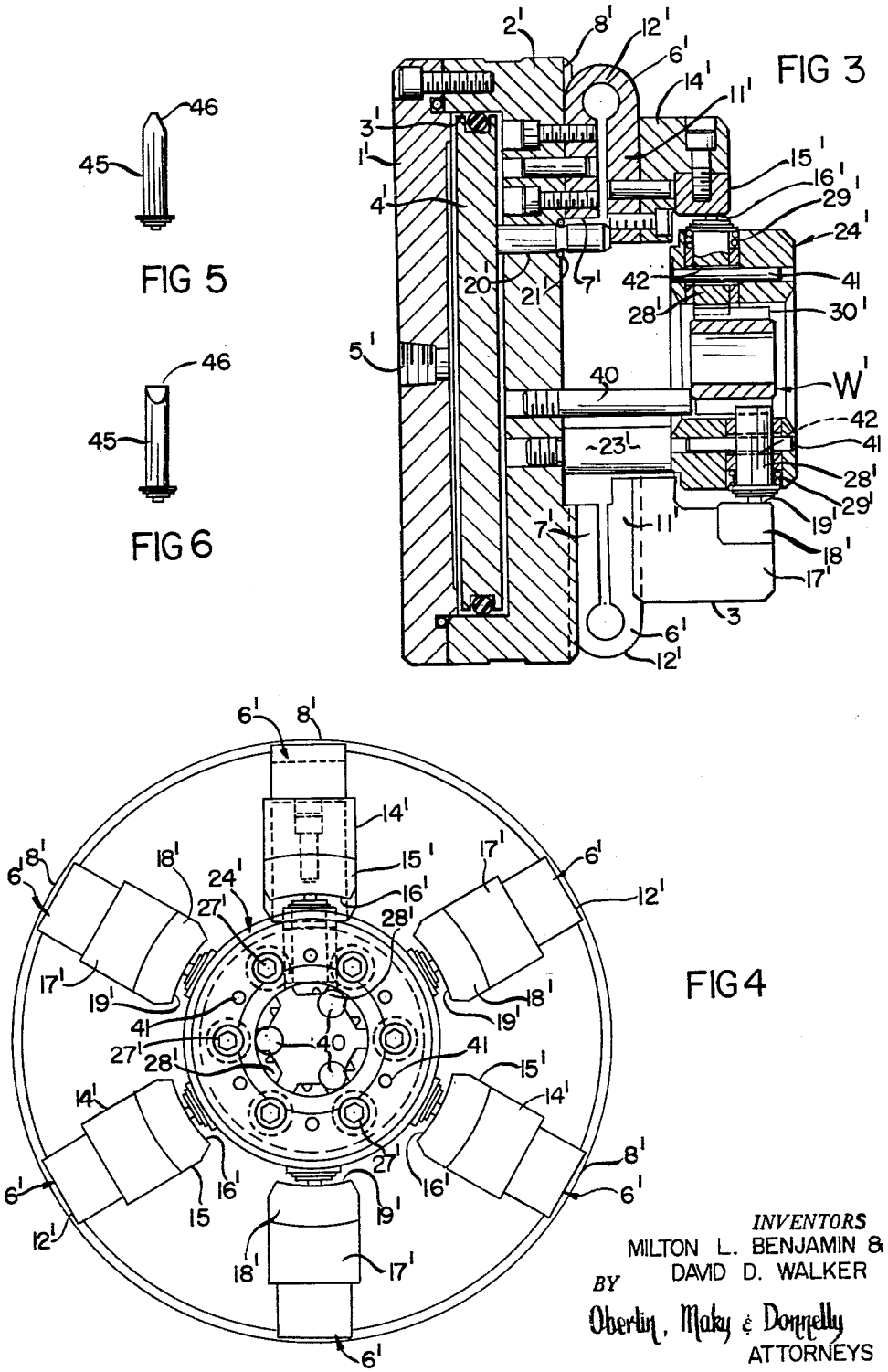

United States Patent Office 3,006,653
Patented Oct. 31, 1961

---

3,006,653
CHUCK FOR GEARS AND THE LIKE
Milton L. Benjamin, Shaker Heights, and David D. Walker, Chagrin Falls, Ohio, assignors to Erickson Tool Company, Solon, Ohio, a corporation of Ohio
Filed Oct. 14, 1960, Ser. No. 62,685
12 Claims. (Cl. 279—4)

The present invention relates generally as indicated to a chuck for gears and the like and, more particularly, to a chuck adapted to securely and accurately hold a gear or other workpiece for performance of certain finishing operations thereon such as grinding the end faces so as to be parallel to each other and perpendicular to the axis of the gear, or to finish the center bore of the gear so as to be concentric with the pitch circle of the gear teeth.

It is a principal object of this invention to provide a gear chuck that employs spring jaws with which any of a plurality of replaceable gear-holding cages are adapted to be used, said jaws having axially offset portions to engage corresponding sets of axially offset locators which are engaged with the teeth of the gear to be held in the chuck.

It is another object of this invention to provide a gear chuck of the type referred to in which the axially offset locators may be in the form of straight rack teeth but being engageable with the teeth of spiral gears while yet holding such gears accurately and securely without rocking movement possible.

It is another object of this invention to provide a gear chuck of the type referred to in which the plural sets of spring jaws are actuated by a single actuator such as a piston movable in a cylinder.

It is another object of this invention to provide a novel gear-holding cage or ring which carries gear locators in the form of spring-loaded radially disposed pins having inner ends engageable with the gear teeth and outer ends engageable with the chuck jaws.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 3 is a cross-section view similar to FIG. 1 of another form of chuck embodying the present invention such section having been taken substantially along the line 3—3, FIG. 4;

FIG. 4 is a front end elevation view of the FIG. 3 chuck as viewed from the right-hand side of FIG. 3; and FIGS. 5 and 6 are side elevation views of a different form of gear locating pin in which the inner end thereof engages between successive gear teeth as distinguished from embracing the gear teeth as contemplated in FIGS. 2 and 4, for example.

Figure 1:
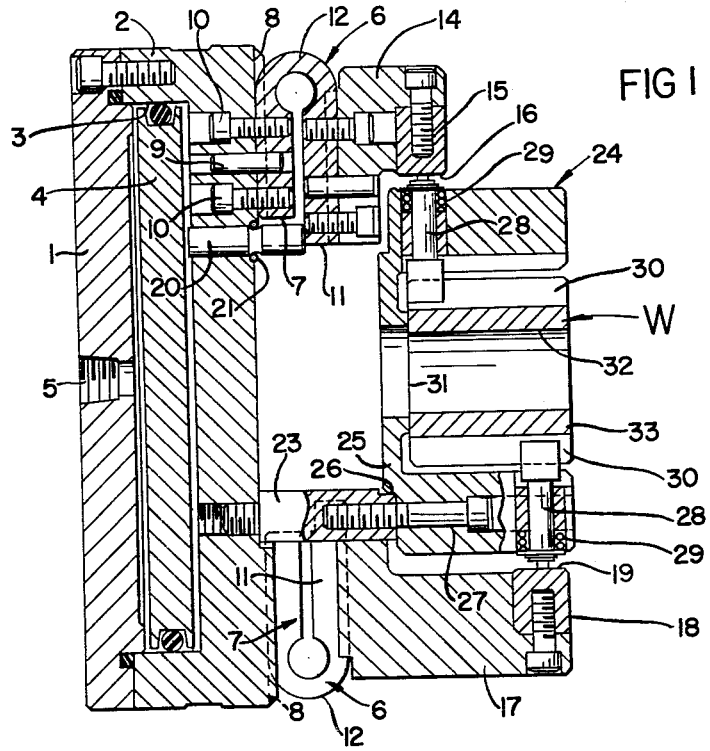
FIG. 1 is a cross-section view taken substantially along the line 1—1, FIG. 2 showing a chuck embodying the present invention.
Figure 2:
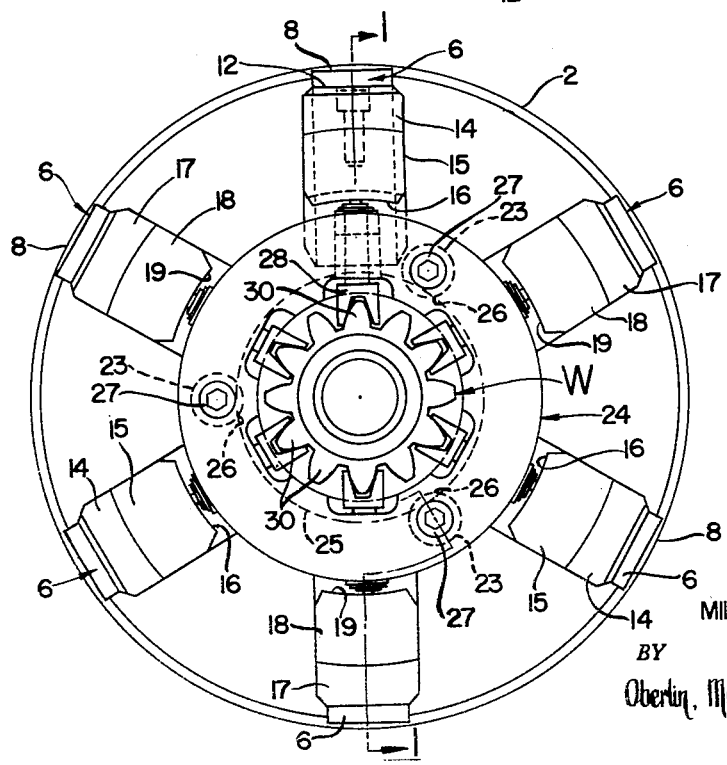
FIG. 2 is a front elevation view of the FIG. 1 chuck as viewed from the right-hand side of FIG. 1.

Referring now in detail to the drawings and first to the form of the invention illustrated in FIGS. 1 and 2, the same comprises a mounting plate 1 which is adapted to be secured on the end of a machine tool spindle. In turn, there is secured to the mounting plate 1 a jaw carrier plate 2 which forms with the mounting plate a cylinder 3 in which the piston 4 is axially reciprocable, the mounting plate 1 being provided as with a central threaded port 5 for connection of an air supply pipe whereby air under pressure may be admitted into the cylinder 3 to act on the left side of the piston 4 to move it toward the right.

In this case, the jaw carrier plate 2 mounts six spring members 6, each of which are of generally U-shaped form as shown having one leg 7 thereof secured in a radial groove 8 in the outer face of the carrier plate 2 as by pin 9 and screws 10 and having its other and longer leg 11 extending radially inward beyond the inner end of the fixed leg 7. These spring members 6 are preferably of the type which is fully disclosed in the Milton L. Benjamin application, Ser. No. 811,708, filed May 7, 1959, and reference may be had to that application for a more detailed discussion of the construction and features of the spring jaw members 6. However, by way of summary, these spring members 6 are preferably made from straight blocks of metal which have a thinned portion 12 which is bent to curved form as shown, whereby the grain of the metal follows around the bend.

Every other spring member 6 carries a short jaw member 14 which, in the unstressed or slightly stressed condition of the spring member, has hardened pads 15 with inner arcuate faces 16 that lie on a cylinder of prescribed diameter.

The remaining spring members 6 carry long jaw members 17 similarly equipped with pads 18 that have inner arcuate faces 19 that lie on a cylinder of prescribed diameter when the spring members 6 are in unstressed or slightly stressed condition.

The respective sets of jaw members 14 and 17 are swung outwardly for releasing the workpiece W as by means of actuators 20 which extend through holes formed in the jaw carrier plate 2 and which have their opposite ends disposed for engagement with the piston 4 and with the inner faces of the outer legs 11 of the spring members 6. Each actuator 20 is additionally formed with a peripheral groove around which is mounted a rubber-like ring 21 which effects a seal to prevent coolant and foreign matter from entering the cylinder 3. The jaw carrier plate 2 is also provided with cage locating posts 23 which are adapted to be engaged by the cage or workholder 24, the cage 24 having a cylindrical boss 25 that fits within the cylindrical notches 26 formed on the insides of the posts 23.

The workpiece holder 24 is, as aforesaid, in the form of a cage or ring which is adapted to be detachably secured to the chuck as by means of screws 27 that are threaded into the ends of the posts 23. This cage or ring 24 has two sets of three locators 28 which are urged radially outward as by compression springs 29 to hold the outer ends thereof in engagement with the inner curved faces 16 and 19 of the respective jaw members 14 and 17. The inner end of each locator 28 is formed to embrace a tooth 30 of the gear W and in view of the fact that the respective sets of locators 28 are axially and circumferentially offset, the gear W will be securely and accurately held despite the fact that the inner ends of the locators 28 are straight-sided and each has only a point contact with the opposite faces of the tooth embraced thereby.

In the use of the chuck shown in FIGS. 1 and 2 when it is desired to load a gear W into the chuck, air under pressure will be admitted through the port 5 to force the piston 4 toward the right. This moves the outer legs 11 of the spring members 6 outwardly and thereby causes the jaw members 14 and 17 to swing out. The springs 29 of the locators 28 will cause the respective locators 28 to move radially outwardly, whereupon the gear W to be chucked may be inserted therebetween against the stop 31 of cage 24. Thereafter, the air pressure in the left chamber of the cylinder 3 will be vented whereupon the jaws 14 and 17 will tend to be sprung back by spring members 6 to the position shown in FIG. 1. The resulting inward swinging of the jaw members 14 and 17 thereby pressed the locators 28 radially inwardly to engage the gear teeth 30 at several uniformly spaced points, whereby the pitch circle of the gear W will be centered with respect to the axis of rotation of the chuck. Thus, the bore 32 of the gear W thereof may be accurately finished to maintain concentricity of the bore 32 with the pitch circle of the gear W, or the end face 33 of the gear W may be accurately finished to lie in a plane normal to the centerline of the gear W.

Although the gear W herein is represented as a spur gear it is to be understood that helical gears may likewise be held because the locators 28 are rotatable about their axes to match the helix angle of the teeth.

Referring now to FIGS. 3 and 4, the chuck therein shown is essentially the same as just described and therefore the same or similar parts are identified by the same reference numerals followed by the prime symbol ('). In FIGS. 3 and 4 the locating stops 40 for the workpiece W' are in the form of posts screwed into the jaw carrier plate 2'. Another difference in FIGS. 3 and 4 is that the cage 24' has pins 41 therein that extend through transverse openings 42 formed in the respective locators 28' to retain the inner ends thereof at approximately the desired helix angle of the teeth 30' of the gear W' while permitting outward movement by springs 29' when the jaws 14' and 17' are swung out.

Here again, as in FIGS. 1 and 2, when it is desired to chuck a gear W' or like workpiece, fluid under pressure is admitted through the port 5' into the left chamber of the cylinder 3' whereupon the piston 4' is moved to the right and through the actuator pins 20' the jaw assemblies 14' and 17' are swung outwardly and the locators 28' are moved outwardly a corresponding distance by contact with the pad surfaces 16' and 19' maintained by the locator biasing springs 29'. With the jaws 14' and 17' thus opened and the locators 28' moved out, the workpiece W' may be positioned within the cage 24' in engagement with the ends of the posts 40 whereupon the air pressure in the cylinder 3' is vented to allow the spring members 6' to spring back to the position shown in FIG. 3. Such spring action moves the respective sets of locators 28' radially inwardly to engage uniformly spaced sets of teeth 30' of the workpiece W'.

Instead of employing locators 28 and 28' as shown in FIGS. 2 and 4 which are designed to embrace the gear teeth 30 or 30', the locators 45 may be made as shown in FIGS. 5 and 6 wherein they comprise cylindrical pins having beveled inner ends 46 formed as rack teeth to fit between adjacent teeth of the gear.

In any event, both forms of the invention disclosed herein, and irrespective of the type of locators employed, that is, whether of the FIG. 2 or 4 type, or of the FIG. 5, 6 type, have as one main feature the provision of axially offset and circumferentially staggered sets of spring jaws 14 and 17 or 14' and 17' and corresponding sets of locators 28 or 28', whereby even spur or helical gears are firmly and accurately held despite the fact that the locators 28, 28', or 45 are formed with straight-sided interdental spaces (in locators 28 and 28'') or straight-sided teeth (in locators 45). Thus, gears W or W' of relatively great face width are accurately and securely held for performance of finishing operations thereon.

Another important feature of this invention is that a single chuck structure may be employed for chucking any of a wide variety of sizes and types of gears without making any changes in the chuck settings simply by providing a plurality of cages for the respective sizes and types of gears. It is, therefore, a simple matter at the conclusion of the run of one size of gear to remove that cage with its locators and replace it with another cage for the next run of a different size or type of gear. Such replacement is accomplished very quickly since all that it is necessary to do is to remove the screws 27 or 27' to remove one cage and to reinstall these screws to mount the next cage in the chuck.

Other modes of applying the principle of the invention may be employed, change being made as regards the details described, provided the features stated in any of the following claims, or the equivalent of such, be employed.

We therefore particularly point out and distinctly claim as our invention:

1. A gear chuck comprising a jaw mounting plate; series of axially and circumferentially offset jaw assemblies on said plate; a gear holding cage detachably secured to said plate; said cage comprising a ring having series of radially outwardly spring biased locators with outer ends in contact within the respective jaw assemblies and with inner gear tooth engaging ends; and an actuator for moving said jaw assemblies outwardly for corresponding outward movement of said locators whereby a gear to be chucked may be positioned within said cage for engagement by the inner ends of said locators upon inward movement of said jaw assemblies and corresponding inward movement of said locators.

2. The gear chuck of claim 1 wherein each jaw assembly comprises a spring member that yieldably resists outward movement of the locator-contacting portion of said jaw assembly by engagement of said actuator with said jaw assembly whereby upon release of force on said actuator said jaw assembly springs inwardly to move said locator inwardly to engage a tooth of the gear.

3. The gear chuck of claim 1 wherein each jaw assembly comprises a spring member that yieldably resists outward movement of the locator-contacting portion of said jaw assembly by engagement of said actuator with said jaw assembly whereby upon release of force on said actuator said jaw assembly springs inwardly to move said locator inwardly to engage a tooth of the gear; and wherein said actuator comprises a fluid pressure actuated piston, and force transmitting pins interposed between said piston and the respective jaw assemblies.

4. The gear chuck of claim 1 wherein said locators are mounted for turning in said ring about radially disposed axes for engagement of their inner ends with the teeth of a helical gear.

5. The gear chuck of claim 1 wherein said locators have straight-sided inner ends adapted to engage the sides of the teeth of a gear held thereby.

6. The gear chuck of claim 5 wherein said locators are mounted for turning in said ring about their radially disposed axes for engagement of their inner ends with the teeth of a helical gear.

7. The gear chuck of claim 5 wherein said ring has pins therein extending through slots in said locators to maintain the inner ends of the latter in desired rotary position for engagement with the teeth of a spur gear or helical gear as the case may be.

8. A gear chuck comprising a base plate adapted to be mounted on a machine tool spindle; a jaw mounting plate secured to said base plate and defining a cylinder therewith having an inlet port for fluid under pressure; a piston reciprocable in said cylinder; a circular series of radial generally U-shaped spring members each having one radial leg secured to said jaw mounting plate and another radial leg extending radially inward of said one leg; a corresponding circular series of force transmitting pins interposed between said piston and the respective another legs whereby said legs are spread apart upon movement of said piston in one direction by fluid under pressure admitted into said cylinder through said inlet port; axially short and long jaw members secured to alternate another legs of said spring members having inner faces that move radially outward upon spreading apart of said legs as aforesaid; a gear holding cage detachably secured to said jaw mounting plate within said jaw members; said cage comprising a ring having series of axially offset, radially outwardly spring-biased locators with outer ends in contact with the respective inner faces of said long and short jaw members and with inner gear tooth engaging ends that are moved into engagement with the teeth of a gear inserted into said cage upon release of fluid under pressure in said cylinder and consequent inward movement of said jaw members due to spring-back of said another legs of said spring members.

9. The chuck of claim 8 wherein said inner ends of said locators have straight-sided portions engaging the sides of such gear teeth.

10. The chuck of claim 8 wherein said inner ends of said locators have straight-sided portions engaging the sides of such gear teeth; and wherein said locators are turnable about radial axes for engagement of the inner ends of said locators with the teeth of a spur gear or helical gear as the case may be.

11. The chuck of claim 8 wherein said inner ends of said locators have straight-sided portions engaging the sides of such gear teeth; and wherein said ring has pins therein extending through slots in said locators to maintain the inner ends of the latter in desired rotary position for engagement with the teeth of a spur gear or helical gear as the case may be.

12. A chuck for helical gears of relatively long face width comprising a jaw mounting plate; series of axially and circumferentially offset jaw assemblies on said plate and means therefor for moving inner faces of said jaw assemblies inwardly; and a gear holding cage secured within said jaw assemblies having axially and circumferentially offset locators engaged by the respective inner faces of said jaw assembly and moved inwardly thereby for engagement of the inner ends of said locators with teeth of a gear inserted within said cage.

References Cited in the file of this patent

UNITED STATES PATENTS

| | | |
|---|---|---|
| 2,565,430 | Hohwart | Aug. 21, 1951 |
| 2,568,585 | Hohwart | Sept. 18, 1951 |
| 2,974,968 | Garrison | Mar. 14, 1961 |
| 2,974,969 | Manchester | Mar. 14, 1961 |